United States Patent [19]

Schnell et al.

[11] Patent Number: 4,960,964
[45] Date of Patent: Oct. 2, 1990

[54] QUICK SET GROUNDING ASSEMBLY

[75] Inventors: Kenneth R. Schnell; William E. Slater, both of South Bend, Ind.

[73] Assignee: Hubbell Incorporated, Orange, Conn.

[21] Appl. No.: 310,391

[22] Filed: Feb. 15, 1989

[51] Int. Cl.$^5$ ............................................. H02G 3/08
[52] U.S. Cl. ...................................... 174/51; 411/437; 439/97
[58] Field of Search .................... 174/53, 51; 220/3.2; 411/437; 439/92, 95, 96, 97, 100, 809

[56] References Cited

U.S. PATENT DOCUMENTS

| | | | |
|---|---|---|---|
| 2,149,719 | 3/1939 | Arnest | 220/3.4 |
| 3,084,958 | 4/1963 | Appleton | 220/3.2 X |
| 3,119,895 | 1/1964 | Palmer | 174/51 |
| 3,210,458 | 10/1965 | Palmer | 174/51 |
| 3,575,313 | 4/1971 | Trachtenberg | 220/3.3 |
| 4,315,100 | 2/1982 | Haslbeck et al. | 174/51 |
| 4,392,012 | 7/1983 | Nattel | 174/51 |
| 4,580,689 | 4/1986 | Slater | 220/3.4 |
| 4,666,055 | 5/1987 | Lewis | 220/3.2 |

*Primary Examiner*—Leo P. Picard
*Assistant Examiner*—David A. Tone
*Attorney, Agent, or Firm*—Jerry M. Presson; Mark S. Bicks

[57] ABSTRACT

An electrical wiring box assembly includes a non-metallic electrical box, a metallic grounding plate and a conducting clip. The electrical box includes a pair of mounting lugs for releasably fastening a wiring device. The grounding plate includes a central portion having a downwardly extending coupling flange frictionally retained in a slot formed in one of the box mounting lugs. The grounding plate further includes a pair of connecting portions extending downwardly from the central portion, each having an extending outwardly leg. The conducting clip includes a flat body portion and a raised portion. The flat body portion has a slot for receiving the coupling flange of the grounding plate and a self tapping hole for receiving a mounting screw. The raised portion includes a hole and a plurality of tabs formed by radially extending slits. The hole is slightly smaller than the diameter of the mounting screw. Upon passage of the mounting screw through the hole with the slits, the tabs are deflected downwardly, making firm electrical contact with the mounting screw.

23 Claims, 3 Drawing Sheets

QUICK SET GROUNDING ASSEMBLY

FIELD OF THE INVENTION

The present invention relates to an electrical wiring box assembly. More particularly, the present invention provides an electrical grounding assembly for nonmetallic wiring boxes to ensure grounding of the electrical device mounting screw.

BACKGROUND OF THE INVENTION

Electrical wiring boxes are often made from nonmetallic materials, typically thermoplastic or thermosetting resins with flame retarding agents. Plastic electrical wiring boxes have various advantages but present difficulties in completely grounding the wiring devices and simultaneously providing a quick and secure way of mounting wiring devices thereon.

Both the mounting yoke and the mounting screw of wiring devices mounted in such boxes should be electrically connected to ground. The mounting strap or the mounting screw may become energized by contacting a current bearing conductor of an electrical cable. If the wiring device is not properly grounded, the metal face plate in contact with the mounting strap or screw becomes a potential source of an electric shock. This problem is especially acute in nonmetallic boxes since they are not normally provided with a grounding lug.

Numerous grounding devices or assemblies are described in the prior art to provide electrical contact between the mounting screw of a wiring device and the electrical cable ground wire including clips, springs, or other devices which firmly engage the mounting screw. Examples of these prior art devices are disclosed in the following U.S. Pat. Nos. 2,149,719 to Arnest; 3,119,895 to Palmer; 3,210,458 to Palmer; 3,575,313 to Trachtenberg et al; 4,315,100 to Haslbeck et al; and 4,392,012 to Nattel.

However, these prior art grounding devices suffer from many disadvantages. For example, these devices are usually formed of a thick rigid metal, and thus, generally do not permit a quick set mounting screw to pass therethrough into the wiring box and still maintain firm electrical contact between the mounting screw and the grounding plate. Moreover, many of the prior art grounding devices require bending the clip into intricate shapes or bending the clip to secure it to the wiring box, and thus, are either expensive to make or difficult to assemble.

SUMMARY OF THE INVENTION

Accordingly, an object of the present invention is to provide an electrical grounding assembly for a nonmetallic wiring box permitting rapid and secure mounting of an electrical wiring device in the box.

Another object of the present invention is to provide a grounding assembly that ensures firm electrical contact of the grounding assembly with the mounting screw and the mounting strap of the wiring device.

A further object of the present invention is to provide a grounding assembly which can be used with a wiring box having a quick set mounting assembly.

Yet another object of the present invention is to provide a grounding assembly that can be easily fastened to and unfastened from a wiring box.

A still further object of the present invention is to provide an electrical grounding assembly that is relatively inexpensive and easy to manufacture and install.

The foregoing objects are basically obtained by an electrical wiring box assembly adapted to engage standard mounting screws of an electrical wiring device to be mounted thereon. The electrical wiring box assembly includes a nonmetallic electrical box, a metallic grounding member and a metallic conducting member. The electrical box includes a pair of lugs located at opposite ends of the box. Each lug includes a fastening portion for releasably engaging the mounting screws of the wiring device to the box. The metallic grounding member includes a coupling element for releasably coupling the grounding member to the box, and a grounding fastener for securing a ground conductor wire of an electric cable to the metallic grounding member. The metallic conducting member electrically connects the mounting screw of the wiring device and the grounding member. The metallic conducting member includes an attaching element for releasably retaining the conducting member to the ground member.

The foregoing objects are further obtained by an electrical grounding assembly adapted to engage a mounting screw of an electrical wiring device and to be coupled to an electrical wiring box. The electrical grounding assembly includes a metallic grounding member and a metallic conducting clip. The metallic grounding member includes a coupling element for releasably coupling it to the wiring box and a grounding fastener for securing a ground conductor wire of an electrical cable thereto. The metallic conducting clip electrically connects the mounting screw of the electrical wiring device to the grounding member. The conducting clip has an attaching element for retaining the conducting clip to the grounding member.

The foregoing objects are also obtained by a conducting clip adapted for use with a grounding plate and an electrical wiring device. The conducting clip includes a metallic body having a flat body portion and a raised portion. The raised portion has a hole extending therethrough with a plurality of slits extending radially outwardly from the hole. These slits define a plurality of deflectable tabs.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this disclosure.

DETAILED DESCRIPTION OF THE INVENTION

Figure 1:
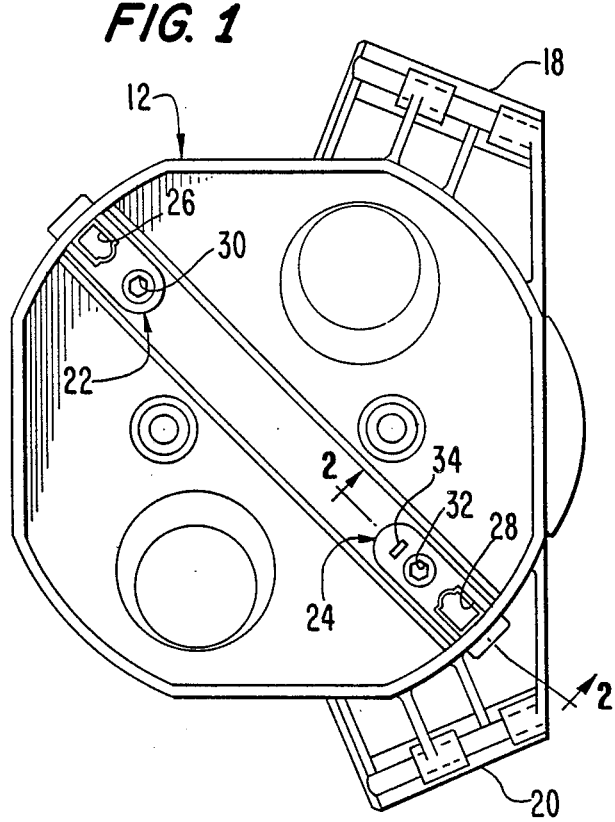
FIG. 1 is a top plan view of a ceiling outlet or fixture wiring box in accordance with the present invention.
Figure 2A:
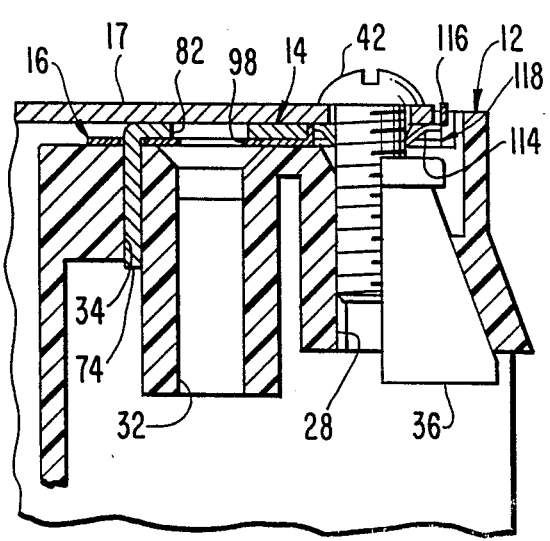
FIG. 2A is an enlarged, partial side elevational view in section taken along line 2—2 of FIG. 1 along with the conducting clip, the grounding member and the mounting strap of a wiring device coupled thereto by a standard mounting screw received in the first mounting opening.
Figure 2B:
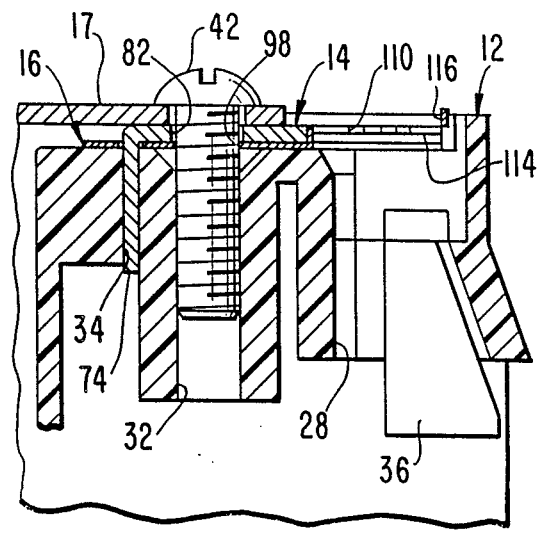
FIG. 2B is an enlarged, partial side elevational view in section taken along line 2—2 of FIG. 1 along with the conducting clip, the grounding member and the mounting strap of a wiring device coupled thereto by a standard mounting screw received in the second mounting opening.
Figure 3:
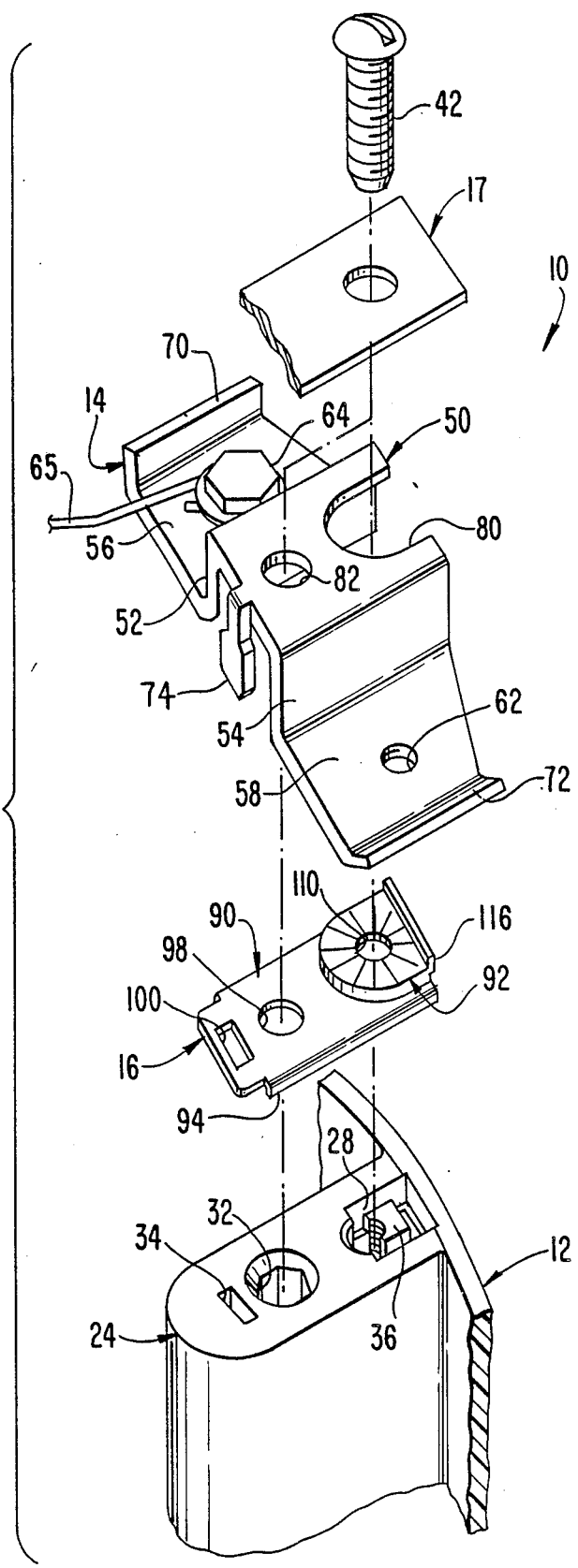
FIG. 3 is an enlarged, partially exploded perspective view, showing the mounting lug of the wiring box, the conducting clip, the grounding member and the mounting screw of a wiring device.

Referring initially to FIGS. 1-3, an electrical outlet or fixture wiring box assembly 10 in accordance with the present invention includes a nonmetallic electrical wiring box 12, a grounding member or plate 14 and a conducting member or clip 16 for securing and grounding a wiring device having a mounting strap 17. The wiring box 12 is preferably molded by conventional molding techniques of a plastic or resinous material, such a polyethylene, polypropylene, polyvinylchloride or the like. The wiring box 12 may be provided with integrally molded features such as nail up members 18 and 20 and mounting lugs 22 and 24.

The mounting lugs 22 and 24 include first mounting openings 26 and 28 and second mounting openings 30 and 32. Mounting lug 24 further includes a grounding plate slot 34.

As seen in FIG. 2A, first mounting opening 28 is adapted to receive an insert member 36 for engaging a standard mounting screw 42 (typically No. 8 screws) to secure an electrical wiring device to the wiring box 12. Likewise, first mounting opening 26 is adapted to receive an insert member 36 for securing a standard mounting screw 42 of an electrical wiring device therein. Screw 42 is initially inserted by axial or translational movement only for initial attachment, and then is tightened by rotation. This arrangement is more fully described in the co-pending U.S. Pat. Application Ser. No. 07/311,334, entitled "Electrical Box with Coupling Members" filed on Feb. 15, 1989 in the name of Robert W. Jorgenson and Kenneth R. Schnell and assigned to the present assignee and which is incorporated herein by reference.

The second mounting openings 30 and 32 are self-tapping hexagonal bores which are formed in accordance with U.S. Pat. No. 4,666,055 to Lewis incorporated herein by reference. These second mounting openings 30 and 32 are used instead of first mounting openings 26 and 28 when a smaller wiring device is used. Thus, second mounting openings 26 and 28 are adapted to threadably engage mounting screws 42, as seen in FIG. 2B, for fastening a wiring device to the wiring box 12.

Figure 4:
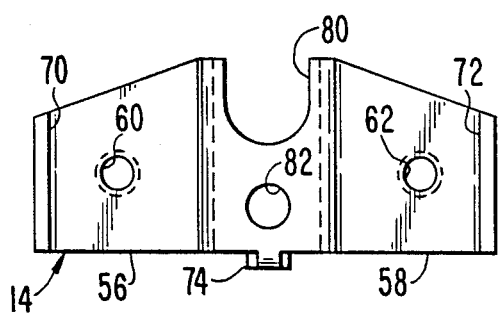
FIG. 4 is an enlarged top plan view of a grounding member in accordance with the present invention.
Figure 5:
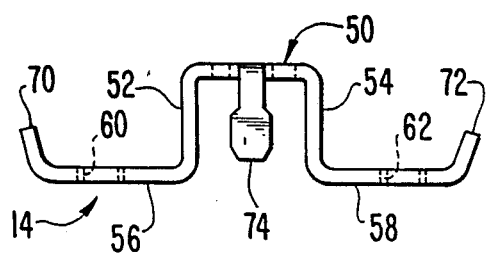
FIG. 5 is a front elevational view of the grounding member of FIG. 4.

Turning to FIGS. 4 and 5, grounding member 14 is formed from steel or similar electrically conductive material, e.g., 0.062 inch cold rolled galvanized steel. The grounding member 14 is preferably formed by stamping or other conventional techniques known in the metal working arts.

The grounding member 14 includes a substantially planar central portion 50, a pair of substantially planar connecting portions 52 and 54 extending generally perpendicularly and downwardly from the central portion 50, and a pair of substantially planar legs 56 and 58 extending outwardly from respective connecting portions 52 and 54.

The central portion 50 includes a coupling flange 74 bent downwardly from central portion 50. The coupling flange 74 connects grounding member 14 to the wiring box 12 by being frictionally retained in slot 34, as seen in Figs. 2A and 2B. The central portion 50 further includes a U-shaped cut-out portion 80 and a bore 82 extending therethrough. Bore 82 is slightly larger than the diameter of mounting screw 42, such that mounting screw 42 will pass freely through bore 82.

Legs 56 and 58 include internally threaded bores 60 and 62 extending respectively therethrough for threadably receiving a grounding fastener or screw 64. Depending on the location of the electrical ground conductor wire 65 of an electrical cable, grounding screw 64 is threaded into either bore 60 or 62. Ground wire 65 is looped about ground screw 64, for securing it to grounding member 14 as shown in FIG. 3. The legs 56 and 58 further include upwardly turned portions 70 and 72, respectively, for retaining the ground wire 65 adjacent to the grounding screw 64.

The conducting member 16 is formed out of thin sheet metal, e.g., 0.005 to 0.010 inch steel or other conductive material. The conducting member 16 is formed by stamping or other conventional techniques known in the metal working arts. The conducting member 16 is made of a thinner material than the grounding member 14, so that the assembly may be used with a wiring box 12 having a quick set mounting arrangement, as discussed below.

Figure 7:
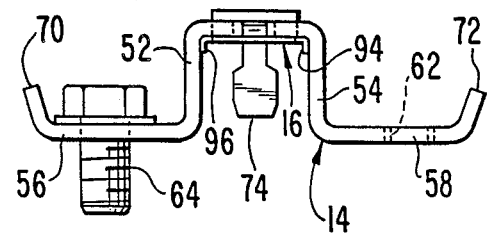
FIG. 7 is a front elevational view of the grounding member and the conducting clip of FIG. 6.
Figure 8:
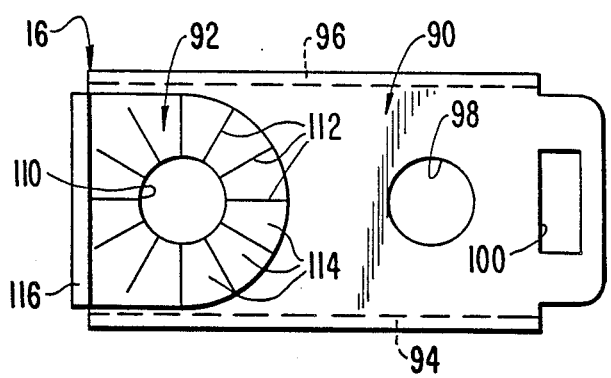
FIG. 8 is an enlarged top plan view of the metallic conducting clip in accordance with the present invention.
Figure 9:
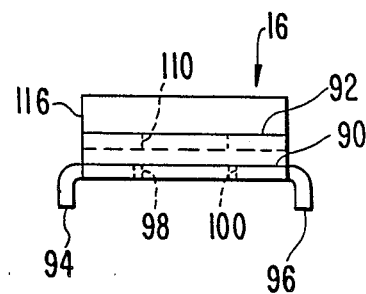
FIG. 9 is a front elevational view of the conducting clip of FIG. 8.
Figure 10:
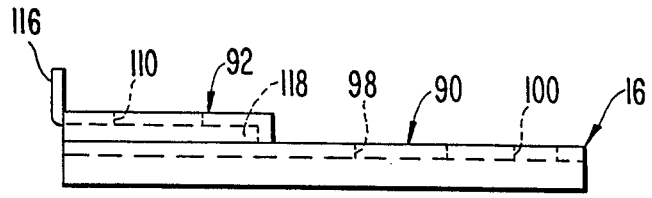
FIG. 10 is a side elevational view of the conducting clip of FIG. 8.

Referring to FIGS. 8-10, conducting member 16 includes a flat body portion 90, a raised portion 92 and a pair of downwardly extending legs 94 and 96. The flat body portion 90 includes a self-tapping throughhole 98 sized so as to be tapped upon passage of mounting screw 42 therethrough and an elongated aperture or slot 100 sized to permit coupling flange 74 to pass therethrough. The raised portion 92 includes a throughhole 110 and a plurality of radially extending slits or cuts 112 extending outwardly from throughhole 110, thereby forming a plurality of deflectable tabs 114. The raised portion 92 also includes an upwardly extending flange 116. The conducting member 16 is attached to grounding member 14 by the outer surfaces of legs 94 and 96 frictionally engaging the inner surfaces of connecting portions 52 and 54 for releasably retaining them together as particularly shown in FIG. 7.

The conducting member 16, being made of a thin metallic material, assures firm electrical contact between the mounting screw 42 either by throughhole 98 being tapped (FIG. 2B) or tabs 114 being deflected downwardly by mounting screw 42 (FIG. 2A), which functions are not possible with the thick grounding member 14. Grounding member 14 is made of a thicker material than the conducting clip 16 to permit the grounding member 14 to be threaded and a ground screw 64 to be threadably received in holes 60 or 62, and to resist bending when ground wire 65 is secured thereto, which features are not possible with the thin conducting member 16 by itself. In other words, the conducting member 16 permits the use of a quick set mounting arrangement because it is thin enough that mounting screw 42 can either tap throughhole 98 or deflect tabs 114 downwardly to make firm electrical contact therewith. Grounding member 14 is sufficiently thick to threadably receive ground screw 64 and to resist bending when ground wire 65 is attached.

Figure 6:
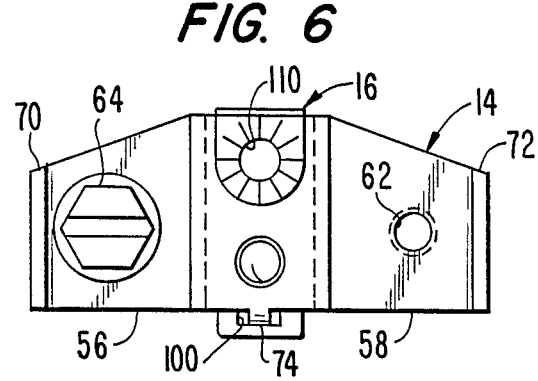
FIG. 6 is an enlarged top plan view of a grounding member and a conducting clip assembled together.

In assembly, conducting member 16 is positioned between portions 52 and 54 of grounding member 14 so that coupling flange 74 extends through slot 100 and raised portion 92 is received in the U-shaped cut-out 80 as shown in FIGS. 6 and 7. Bore 82 is coaxially aligned with throughhole 98. The conducting member 16 is now frictionally retained between connecting portions 52 and 54 of grounding member 14. The connected grounding member 14 and conducting member 16 then can be coupled to wiring box 12 by inserting coupling flange 74 into slot 34 which is sized to frictionally retain coupling flange 74 therein as shown in FIGS. 2A and 2B.

As seen in FIG. 2A, mounting screw 42 can be inserted into throughhole 110 by linear or translational movement (i.e., without rotation). Hole 110 is sized to cause tabs 114 to be deflected downwardly into the space 118 formed by raised portion 92. In this way, tabs 114 firmly engage mounting screw 42 to assure electrical contact and positive mechanical engagement therebetween. The screw 42 is then secured in hole 28 as described above.

As seen in FIG. 2B, when a smaller wiring device is used, mounting screw 42 is rotated into throughhole 98 and mounting opening 32 thereby tapping throughhole 98 and opening 32, and assuring electrical contact between mounting screw 42 and conducting member 16 and mechanical coupling to the box.

The ground wire 65 of an electrical cable is looped about and secured by ground screw 64, electrically connecting the ground wire 65 to the grounding member 14 as shown in FIG. 3. The positive electrical connection of mounting screw 42 to clip 16 (through tabs 114 or hole 98) and of clip 16 to grounding member 14 (through engagement of grounding member portions 52 and 54 and clip legs 94 and 96), ensures the electrical connection of mounting screw 42 to ground wire 65.

While only one embodiment has been chosen to illustrate the invention, it will be understood by those skilled in the art that various changes and modifications can be made therein without departing from the scope of the invention as defined in the appended claims.

What is claimed is:

1. An electrical wiring box assembly adapted to engage standard mounting screws of an electrical wiring device to be mounted in the box assembly, comprising:
   a nonmetallic electrical box including a pair of lugs located at opposite ends of said box, said lugs having fastening means for releasably engaging the mounting screws of the wiring device thereto;
   a metallic grounding member including coupling means for releasably coupling said grounding member to said box, and grounding means for securing a ground conductor wire of an electrical cable thereto; and
   a metallic conducting means for electrically connecting the mounting screw of the electrical wiring device and said grounding member, said conducting means including attaching means for releasably retaining said conducting means to said grounding member.

2. An electrical wiring box assembly according to claim 1, wherein
   said conducting means includes an hole extending therethrough and a plurality of slits extending radially outwardly from said hole and forming a plurality of tabs between said slits, said hole being smaller than the standard diameter of the mounting screws of the wiring device, whereby passage of one of the mounting screws through said hole deflects said tabs downwardly to make firm electrical contact therewith.

3. An electrical wiring box assembly according to claim 2, wherein
   said conducting means includes a generally flat body portion and a raised portion, said raised portion supporting said tabs above said body portion allowing said tabs to be deflected downwardly by the mounting screw.

4. An electrical wiring box assembly according to claim 3, wherein
   said grounding member includes a cut-out receiving said raised portion of said conducting means.

5. An electrical wiring box assembly according to claim 4, wherein
   said cut-out and said raised portion are both generally U-shaped.

6. An electrical wiring box assembly according to claim 1, wherein
   said coupling means includes a downwardly extending flange frictionally engaged in a slot in one of said lugs of said box.

7. An electrical wiring box assembly according to claim 6, wherein
   said conducting means includes an aperture receiving said coupling flange, whereby passage of said coupling flange through said aperture properly aligns said conducting means and said grounding member.

8. An electrical wiring box assembly according to claim 1, wherein
   said grounding member includes a generally planar central portion, a pair of connecting portions extending generally perpendicularly from opposite edges of said central portion, and legs extending outwardly from said connecting portions.

9. An electrical wiring box assembly according to claim 8, wherein
   said attaching means includes a pair of legs located between and frictionally engaging said connecting portions.

10. An electrical grounding assembly adapted to engage a standard mounting screw of an electrical wiring device and to be coupled to an electrical wiring box, comprising:
    a metallic grounding member including coupling means for releasably coupling said grounding member to the box, and grounding means for securing a ground conductor wire of an electrical cable thereto; and
    a metallic conducting clip for electrically connecting the mounting screw of the electrical wiring device and said grounding member, said conducting clip including attaching means for retaining said conducting clip to said grounding member.

11. An electrical grounding assembly according to claim 10, wherein
    said conducting clip includes a hole extending therethrough and a plurality of slits extending radially outwardly from said hole forming a plurality of tabs between said slits, said hole being smaller than the standard diameter of the mounting screws of the wiring device, whereby passage of one of the mounting screws through said hole deflects said tabs downwardly to make firm electrical contact therewith.

12. An electrical grounding assembly according to claim 11, wherein
said conducting clip includes a generally flat body portion and a raised portion, said raised portion supporting said tabs above said body portion allowing said tabs to be deflected downwardly by the mounting screw.

13. An electrical grounding assembly according to claim 12, wherein
said grounding member includes a cut-out receiving said raised portion of said conducting clip.

14. An electrical grounding assembly according to claim 13, wherein
said cut-out and said raised portion are both generally U-shaped.

15. An electrical grounding assembly according to claim 10, wherein
said coupling means includes a downward extending flange frictionally engaged in a slot in one of the lugs of the box.

16. An electrical grounding assembly according to claim 15, wherein
said conducting clip includes an aperture receiving said coupling flange, whereby passage of said coupling flange through said aperture properly aligns said conducting clip and said grounding member.

17. An electrical grounding assembly according to claim 10, wherein
said grounding member includes a generally planar central portion, a pair of connecting portions extending generally perpendicularly from opposite edges of said central portion, and legs extending outwardly from said connecting portions.

18. An electrical grounding assembly according to claim 17, wherein
said attaching means includes a pair located between and frictionally engaging said connecting portions such as to be retained therebetween.

19. A conducting clip adapted for use with a grounding plate and an electrical wiring device, comprising:
a metallic body including
a flat body portion having a throughhole smaller than the standard diameter of a mounting screw of a wiring device and having an aperture for receiving a coupling flange of a grounding plate, said aperture being spaced and separate from said throughbore, and
a raised portion having a hole extending therethrough with a plurality of slits extending radially outwardly from said hole, said slits defining a plurality of deflectable tabs.

20. A conducting clip according to claim 19 wherein said throughbore is located between said aperture and said hole.

21. A conducting clip according to claim 19 wherein legs depend form lateral sides of said flat body portion.

22. A conducting clip according to claim 19 wherein a flange extends upwardly from a free end of said raised portion.

23. An electrical wiring box assembly adapted to engage standard mounting screws of an electrical wiring device to be mounted in the box assembly, comprising:
a nonmetallic electrical box including a pair of lugs located at opposite ends of said box, said lugs having fastening means for releasably engaging mounting screws of a wire device, one of said lugs having a slot;
a metallic grounding member including a substantially planar central portion, a pair of connecting portions extending downwardly from opposite edges of said central portion, legs extending outwardly from said connecting portions, and a grounding fastener for securing a ground conductor wire of an electrical cable to one of said legs,
said central portion including downwardly extending coupling flange frictionally engaged in said slot, a bore extending therethrough for receiving a standard mounting screw and a cutout portion; and
a metallic conducting clip for electrically connecting the mounting screw of the electrical wiring device and said grounding member, said conducting clip including a flat body portion, a raised portion received in said cutout portion and a pair of legs extending downwardly from said flat body portion,
said flat body portion including a throughhole being smaller than the standard diameter of the mounting screws and a slot receiving said coupling flange for properly aligning said conducting clip and said grounding member together, and
said raised portion having a hole extending therethrough with a plurality of slits extending radially outwardly from said hole forming a plurality of deflectable tabs therebetween, said hole being smaller than the standard diameter of the mounting screws, whereby passage of one of the mounting screws through said hole deflects said tabs downwardly to make firm electrical contact therewith; and
said legs of said conducting clip being located between and frictionally engaging said connecting portions.

* * * * *